United States Patent Office 3,394,429
Patented July 30, 1968

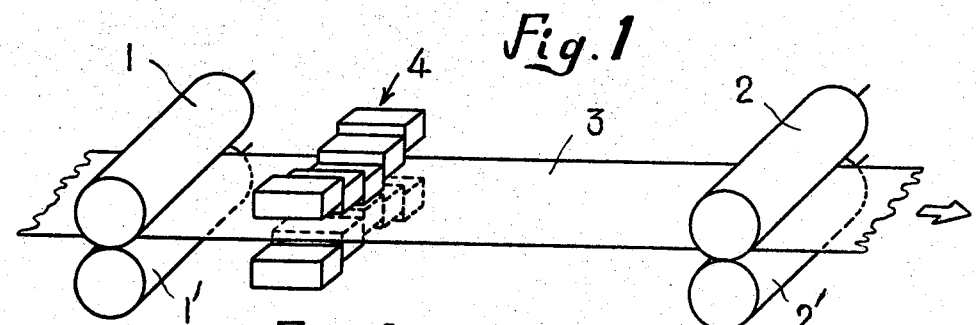
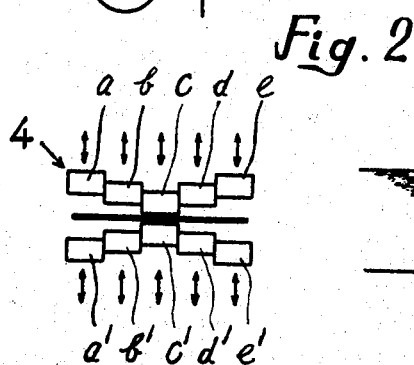
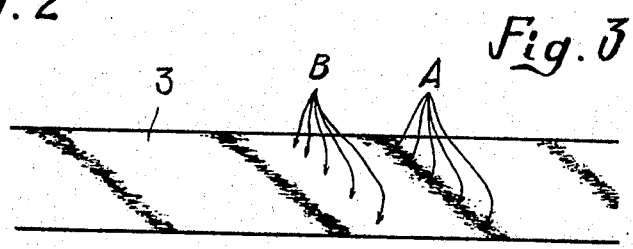
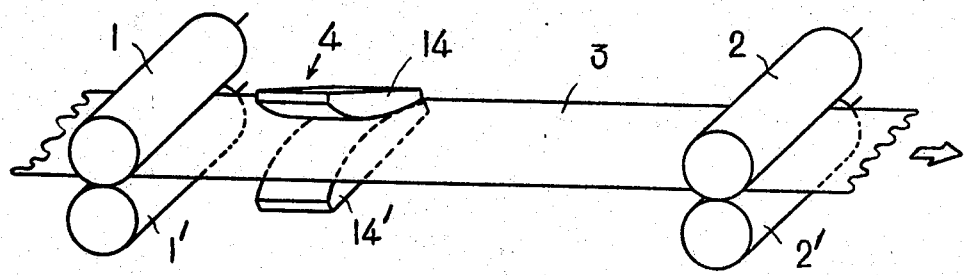
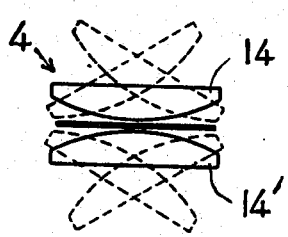
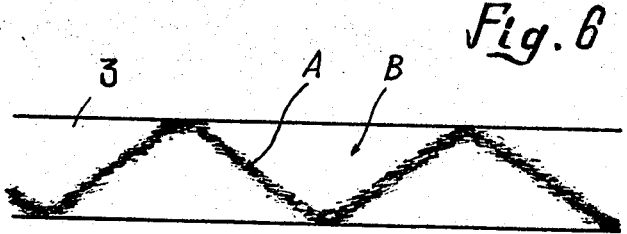

3,394,429
APPARATUS FOR STRETCHING THERMOPLASTIC SYNTHETIC FIBERS
Kazumi Nakagawa, Takuro Hayahara, and Nobuyuki Kishimoto, Saidaiji, Japan, assignors to Japan Exlan Company Limited, Osaka, Japan
Filed July 16, 1964, Ser. No. 383,074
Claims priority, application Japan, July 17, 1963, 38/38,768
2 Claims. (Cl. 18—1)

ABSTRACT OF THE DISCLOSURE

An apparatus for stretching a tow of thermoplastic synthetic resin filaments comprising means for moving the tow continuously in the direction of its length, means for applying a tension force thereto only in the direction of its length, means to heat the tow in the least one zone extending transversely of the length of the tow, and means for applying the heat cyclically to the tow.

---

This invention relates to an apparatus for stretching thermoplastic synthetic fibers.

It is known to modify the properties of thermoplastic synthetic fibers (inclusive filaments, tow or bundles of filaments) by stretching the same while heating. It is also known that, generally, when the temperature at which the fiber is stretched is higher the degree of plasticization of the fiber becomes higher with the result that the effect of stretching is more enhanced.

It has been conventional to thermally stretch synthetic fibers at a uniform temperature throughout the fiber being stretched. For example, a tow obtained by combining several bundles of filaments is stretched while being continuously passed through a uniform heating zone or along uniformly heated plates in order to obtain uniform stretching effect throughout the tow.

The present invention is in complete contrast to the conventional conception of uniform stretching or heating. Thus, according to this invention, thermoplastic fiber or tow of filaments is subjected to a periodical or cyclical variation in temperature in a direction lengthwise and/or crosswise with respect to the longitudinal or traveling direction of the fiber while being stretched. In this way, each filament or fiber is given properties periodically or cyclically different in the crosswise and/or lengthwise direction. For example, even in a single filament, a portion is highly stretched and hence highly shrinkable upon subsequent heat treatment in a relaxed state while other is not or less stretched and hence non or less shrinkable upon such subsequent heat treatment. Therefore, by cutting the fiber treated by this invention into staple there are obtained both shrinkable staple fibers and non or less shrinkable staple fibers. These cut fibers having different thermal shrinkage properties may be mix-spun into a yarn which, when subsequently subjected to a thermal treatment in the usual manner, develops bulkiness.

It will be noted that according to this invention there are obtained fibers of different physical properties (e.g. thermal shrinkability) are obtained simultaneously in a single and same stretching operation.

In carrying out this invention any conventional stretching apparatus may be used except a heating device. A typical stretching apparatus comprises a plurality of rolls which are driven at different speeds so that a draft or stretch is imparted on the fiber travelling between these rolls. The feature of the invention is not in the fundamental stretching apparatus itself but is in the use of a heating device arranged or designed to heat the fiber to periodically or cyclically different degree while it advances through the stretching apparatus which may be known per se. Generally, it is preferable that the heating device is so constructed that may be periodically or cyclically moved across the running direction of the tow or fiber in such a manner that the distance between the heat radiating surface and the fiber is periodically or cyclically varied across the fiber.

The invention will be described in more detail by referring to the accompanying drawings wherein:
FIG. 1 is a schematic view of an apparatus of this invention,
FIG. 2 is a schematic front view of an assembly of heating elements used in the apparatus of FIG. 1,
FIG. 3 is a schematic top view of the tow treated by the apparatus of FIG. 1,
FIG. 4 is a view similar to FIG. 1 but showing another embodiment of the invention,
FIG. 5 is a schematic front view of a heating element used in the apparatus of FIG. 4, and
FIG. 6 is a schematic top view of the tow treated by the apparatus of FIG. 4.

Referring to FIG. 1, the stretching apparatus shown comprises a pair of feed rolls 1, 1' and a pair of stretch rolls 2, 2', with a suitable space between the pairs. A tow in the form of a flat ribbon 3 is passed through the rolls as shown. These rolls are driven at predetermined but different speeds so as to impart to the tow a desired average stretch. A heating device 4 is arranged between the pairs of rolls and across the passage of the ribbon 3. The heating device 4 (FIGS. 1 and 2) comprises an upper plurality of heating blocks $a$, $b$, $c$, $d$, $e$ and a lower corresponding plurality of heating blocks $a'$, $b'$, $c'$, $d'$, $e'$. The upper and lower heating block assemblies are spaced so that the tow 3 can pass therebetween while being stretched. Each pair of the upper and corresponding lower heating blocks, namely $aa'$, $bb'$, $cc'$, $dd'$, $ee'$ is so arranged to be movable away or toward the tow so that the distance between the heat radiating surface of each heating block and the tow can be varied as desired. When the pairs of the upper and lower heating blocks, $aa'$, $bb'$, $cc'$, $dd'$, $ee'$ are periodically moved away and toward the tow 3 as indicated with arrows (FIG. 2) and in a cycle shorter than the residence time of the tow between the outlet of the heating device 4 and the stretching rolls 2, 2', there is obtained on the tow cyclically appearing highly stretched zone and less or non-stretched zone. In FIG. 3 there is shown a sample of a ribbon or tow 3 stretched by the apparatus of FIG. 1 and having the maximum stretch zone A and minimum stretch zone B. Of course, it will be understood that the pattern of these zones may be varied by changing the arrangement of the heating blocks and/or mode of movement thereof and/or speed of the tow. It will be apparent that where the distance between the tow 3 and the heat radiating surface of the heating block is wider the tow or filament is less heated and plasticized so that it is less stretched, whereas where the said distance is less the tow or filament is more stretched.

If it is desired, a plurality of heating devices 4 may be arranged between the rolls 1, 1' and rolls 2, 2'.

In FIGS. 4 and 5, there is shown another embodiment of the invention. This embodiment is different from that of FIG. 1 only in the arrangement of the heating device. As shown, the heating device comprises a pair of upper and lower heating elements 14, 14' each having a curved surface. These elements are arranged with a space therebetween for passing the tow 3 and with the convex faces facing each other as shown. When these heating elements 14, 14' are cyclically swung away and toward the tow across the length of the tow as shown in dotted lines in FIG. 5 so as to cyclically vary the distance between the heating surface of the elements and the tow while the latter is running and stretched by the rolls, there is created cyclically varied pattern of stretched zone and less or non-stretched zone on the tow, e.g. as shown in FIG. 6 wherein A represents maximum stretched zone and B represents minimum stretched zone.

Any other heating device which can cyclically or periodically change the distance between the heat radiating surface and tow causing corresponding variation in the stretching ratio may be used in this invention, without being restricted to the particular ones shown.

The invention may be applied to any of thermoplastic synthetic fibers such as acrylic, polyester, polyamido, polyvinyl, polyolefine, etc. fibers. The temperature of heating, stretch ratio, etc. may be suitably selected depending upon the particular type of fibers and desired stretch ratio. These are well known in the art and therefore no detailed explanation thereabout would be necessary.

The fibers or filaments treated according to this invention may be cut or stretch-broken into staple length. Since the fibers comprise those portions different in properties due to the difference in the degree of thermal stretch, they are useful in various applications. Thus, for example, the staple fibers may be mechanically crimped and then spun into yarns which, when subsequently heat treated in a relaxed state, develop excellent bulkiness. The fibers are also useful in those fields where bulkiness, stretchability, or special hand and appearance are desired.

Example 1

A tow of polyacrylonitrile filaments was stretched by the apparatus shown in FIG. 1, wherein the peripheral speed ratio of the feed rolls 1, 1' to the stretching rolls 2, 2' was 1 to 1.4, with the peripheral speed of the stretching rolls being 30 meters per minute; the distance between the outlet of the heating device 4 and the stretching rolls 2, 2' was 1.2 meters; the surface temperature of each of the heating blocks of the heating device was 230° C.; the length of each heating block was 50 cm. Each pair of the heating blocks $aa'$, $bb'$, $cc'$, $dd'$, $ee'$ was moved away and toward the tow with a cycle of 48 times per minute, between the maximum distance (between the paired heating blocks) of 100 mm. and the minimum distance of 0.5 mm., so that a stretch variation pattern similar to that shown in FIG. 3 was obtained on the tow. The treated tow was stretch-broken into staple length, mechanically crimped and spun into yarn. The yarn was steam treated at relaxed state for 10 minutes at 115° C. to obtain bulky yarn.

The following table shows the relation between the space of the paired heating blocks and the thermal shrinkage of the fibers obtained in this example.

| Distance between heating blocks (mm.): | Thermal shrinkage, steam treated at 115° C. for 10 min. (percent) |
|---|---|
| 100 | 2.3 |
| 50 | 9.5 |
| 30 | 18.7 |
| 0.5 | 26.2 |

Example 2

A tow of polyacrylonitrile filaments was stretched by the apparatus shown in FIG. 4, wherein the peripheral speed ratio of the feed rolls 1, 1' to the stretching rolls 2, 2' was 1 to 1.35, with the peripheral speed of the stretching rolls being 30 meters per minute; the distance between the outlet of the heating device and the stretching rolls 2, 2' was 1.2 meters; the surface temperature of the heating element 14, 14' was 200° C.; the length (along the traveling direction of the tow) of each heating element was 50 cm. The heating elements 14, 14' were swung with a cycle of 60 times per minute and with the maximum space between the elements 14 and 14' being 50 mm. and the minimum being 0.5 mm., so that a stretch variation pattern similar to that shown in FIG. 6 was obtained on the tow. The treated tow was mechanically crimped, cut into staple length, and spun into yarn. The yarn was treated at relaxed state in boiling water for 10 minutes to obtain bulky yarn.

The following table shows the relation between the space of the paired heating elements 14, 14' and the thermal shrinkage of the fibers obtained thereby in this example.

| Distance between heating elements (mm.): | Thermal shrinkage, at 100° C., 10 min. in boiling water (percent) |
|---|---|
| 50 | 0.3 |
| 20 | 15.7 |
| 0.5 | 24.1 |

What we claim is:

1. An apparatus for stretching a tow of thermoplastic synthetic resin filaments, said apparatus comprising means for conveying a tow having the shape of a flat ribbon of filaments in the direction of the length of the tow while applying a tension force to said filaments, said means for conveying the tow comprising feed roll means and stretching roll means spaced from the feed roll means and rotating faster than the feed roll means, whereby the tension is applied to the tow, and heating means positioned along the path of the tow between said feed roll means and said stretching roll means and comprising opposed upper and lower heating elements which are spaced from each other and positioned on opposite sides of the path of the tow, said heating elements being sectioned members having the heat radiating surfaces facing the surface of the tow, the sections of the members being movable toward and away from the surface of the tow, said heating means having at least one heat radiating surface, and including means for moving said heat radiating surface toward and away from the tow and with the distance between the tow and the surface varying cyclically in a direction transversely of the length of the tow, said moving means moving the sections of the members in sequence to produce the cyclical variation of the distance between the tow and the heat radiating surface, whereby the filaments of the tow have spaced portions of the lengths thereof heated and stretched more than the remainder of the filaments, said spaced portions of adjacent filaments in the tow being offset longitudinally of the tow with respect to each other.

2. An apparatus for stretching a tow of thermoplastic synthetic resin filaments, said apparatus comprising means for conveying a tow having the shape of a flat ribbon of filaments in the direction of the length of the tow while applying a tension force to said filaments, said means for conveying a tow comprising feed roll means and stretching roll means spaced from the feed roll means and rotating faster than the feed roll means, whereby the tension is applied to the tow, and heating means positioned along the path of the tow between said feed roll means and said stretching roll means and comprising opposed upper and lower heating elements which are spaced from each other and positioned on opposite sides of the path of the tow, said heating elements being members having a curved heat radiating surface facing the tow, the members being rockable in a direction transversely of the length of the tow, said heating means having at least one heat radiating surface, and including means for moving said heat radiating surface toward and away from the tow and with the distance between the tow and the surface varying cyclically in a direction transversely of the length of the tow, said moving means rocking the heating members back and forth with the closest portions of the curved surfaces moving back and forth across the tow, whereby the filaments of the tow have spaced portions of the lengths thereof heated and stretched more than the remainder of the filaments, said spaced portions of adjacent filaments in the tow being offset longitudinally of the tow with respect to each other.

References Cited

UNITED STATES PATENTS

| | | | |
|---|---|---|---|
| 3,323,165 | 6/1967 | Mottern et al. | 18—1 |
| 2,995,779 | 8/1961 | Winter | 264—210 |
| 3,092,891 | 6/1963 | Baratti | 264—210 |
| 3,343,207 | 9/1967 | Mottern et al. | |

FOREIGN PATENTS

| | | |
|---|---|---|
| 10,856 | 1962 | Japan. |

JAMES A. SEIDLECK, *Primary Examiner.*

T. MORRIS, *Assistant Examiner.*